United States Patent [19]
Kosecoff

[11] 4,332,337
[45] Jun. 1, 1982

[54] FOLDABLE BICYCLE CARRIER

[76] Inventor: Irving W. Kosecoff, 3201 Butler Ave., Los Angeles, Calif. 90066

[21] Appl. No.: 227,517

[22] Filed: Jan. 22, 1981

[51] Int. Cl.³ ............................................... B60R 9/10
[52] U.S. Cl. .............................. 224/42.03 B; 224/309; 224/314; 224/321
[58] Field of Search ................. 224/42.03 B, 309, 314, 224/321

[56] References Cited

U.S. PATENT DOCUMENTS

| | | | |
|---|---|---|---|
| 3,710,999 | 1/1973 | Allen | 224/321 X |
| 3,927,811 | 12/1975 | Nussbaum | 224/314 X |
| 4,085,874 | 4/1978 | Graber | 224/321 |
| 4,182,467 | 1/1980 | Graber | 224/309 |
| 4,290,540 | 9/1981 | Allen | 224/321 X |

*Primary Examiner*—Steven M. Pollard
*Attorney, Agent, or Firm*—Eric T. S. Chung

[57] ABSTRACT

A foldable bicycle carrier for carrying bicycles and the like on automobiles and other vehicles is disclosed. The subject carrier is characterized by a unitary hanger member to which is movably attached a pair of legs. A locking mechanism serves to rotably attach each of the legs to the hanger member such that the subject carrier is able to be folded flat to have both the legs and the hanger member be in a single plane when the carrier is not in use. The locking mechanism also serves to lock each of the legs when the carrier is in an extended operative configuration to prevent accidental collapse or folding.

11 Claims, 8 Drawing Figures

U.S. Patent    Jun. 1, 1982    Sheet 1 of 2    4,332,337
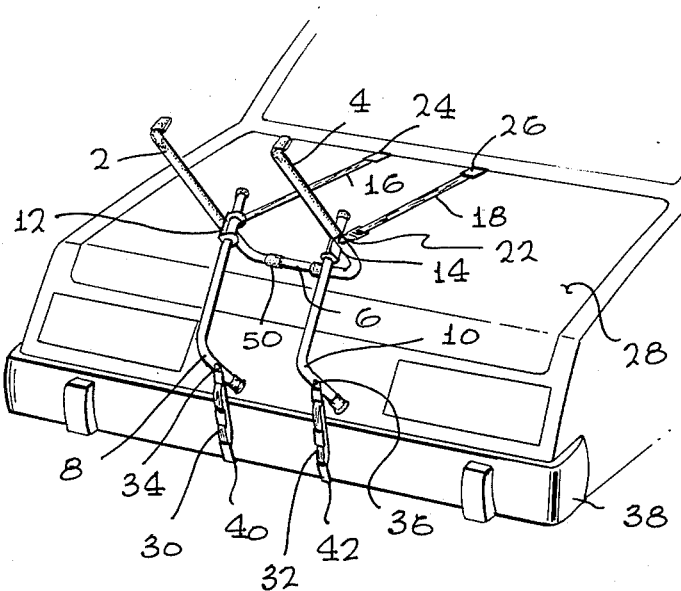
FIG. 1
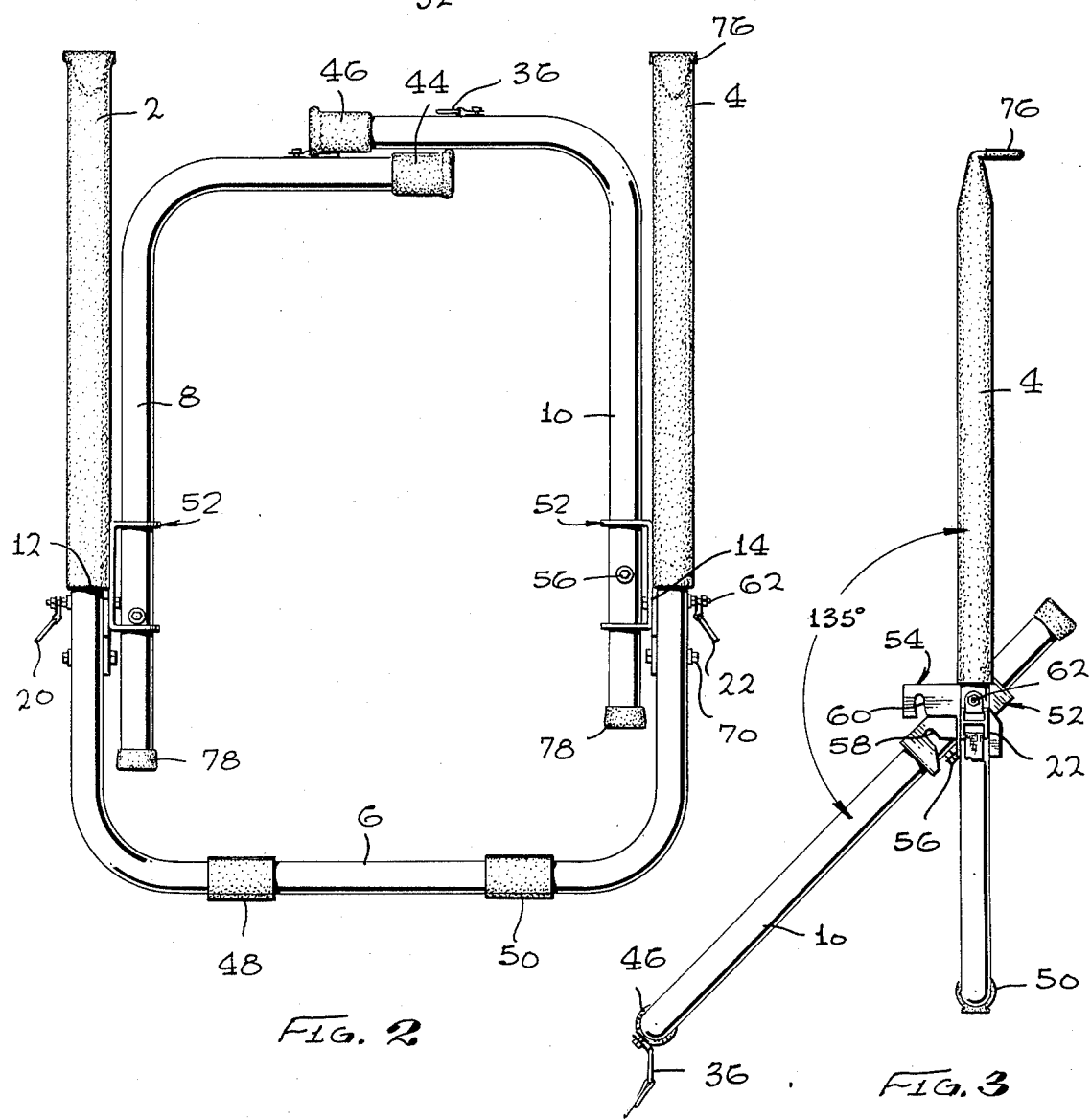
FIG. 2
FIG. 3

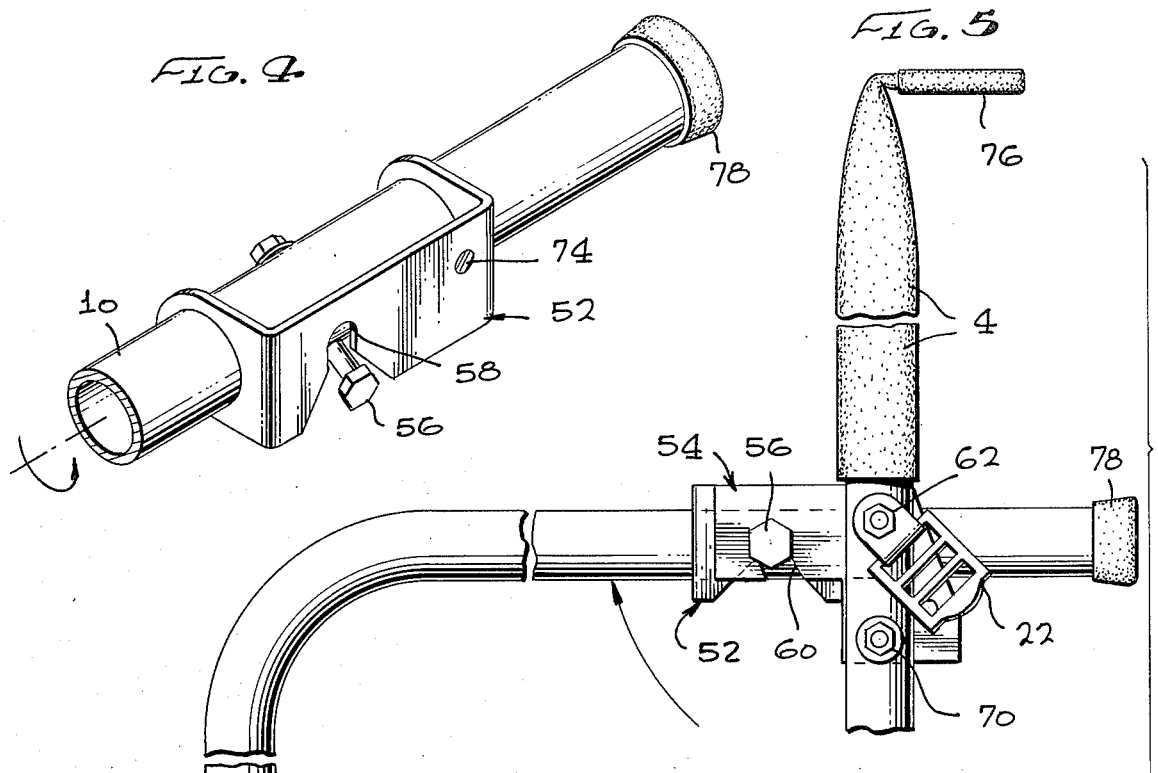
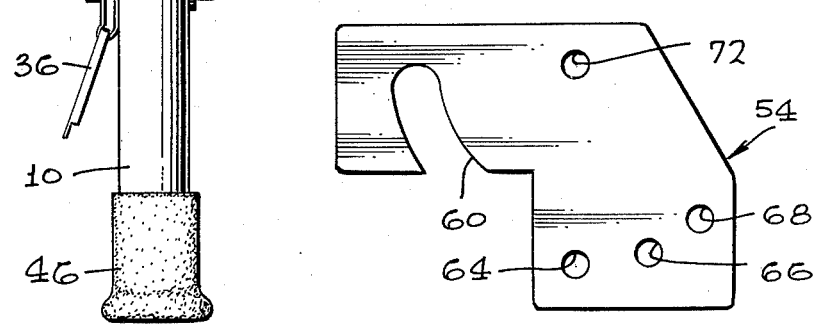
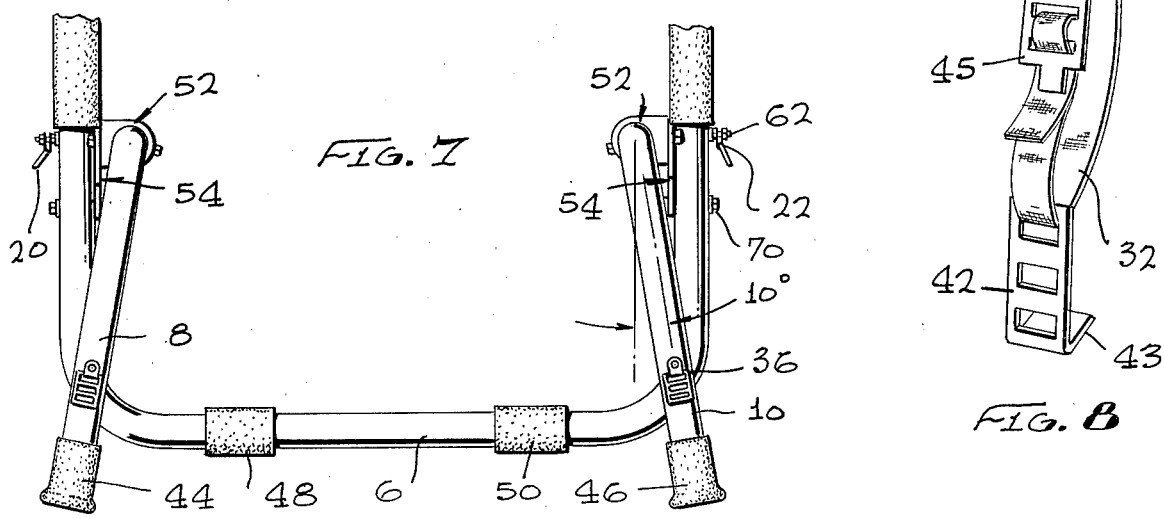

FOLDABLE BICYCLE CARRIER

BACKGROUND OF THE INVENTION

1. Field of the Invention

The present invention is directed to portable bicycle carriers. More particularly, the present invention concerns an improved foldable bicycle carrier that is assembled as a single unit capable of being folded to occupy a single plane for easy and compact storage, but which when in an extended configuration, provides a sturdy fixture that may be easily mounted on a vehicle to safely carry bicycles above and rearward of the trunk lid of the vehicle.

2. Description of the Prior Art

There are numerous bicycle carriers available in the prior art which are designed to be mounted on an automobile or other like vehicle for the purpose of carrying bicycles thereon.

Generally, one class of such carriers involves a plurality of parts which must be assembled before the carrier is used, and disassembled and removed from a vehicle when the carrier is not in use. A second class of bicycle carriers involves all of the elements of the carrier being pre-assembled but which are designed to be folded to a generally compact configuration to substantially facilitate storage.

The prior art bicycle carriers of the foldable type are found to have several shortcomings. Some of these shortcomings are the lack of structural integrity resulting in accidental folding or collapse of the carrier when in use; the use of elements which accidentally cause damage to the automobile when placed in contact with supporting surfaces of an automobile due to the concentration of downward force from the weight of a bicycle or bicycles being carried; and the use of straps or the like as the primary load bearing members to support the weight of bicycles being carried besides securing the carrier on an automobile or other vehicle.

OBJECTS AND SUMMARY OF THE INVENTION

It is accordingly a primary object of the present invention to provide an improved foldable bicycle carrier which may be easily folded to a compact, flat configuration to permit easy storage and when in use to provide a bicycle carrying fixture which is not vulnerable to accidental collapse.

It is another object of the present invention to provide a foldable bicycle carrier which is designed to distribute the weight of the bicycles being carried over a large surface area to limit or eliminate the potential for accidental damage to a carrying vehicle when the carrier is in use.

It is a further object of the present invention to provide a foldable bicycle carrier that is easily converted to an extended operative configuration.

It is a further object of the present invention to provide a foldable bicycle carrier which is equipped to have a locking mechanism which substantially eliminates accidental collapse of a carrier once mounted in an operative position on a vehicle.

More particularly, a foldable bicycle carrier in accordance with the subject invention includes a U-shaped unitary hanger member to which is attached a pair of leg members by a pair of locking mechanisms wherein the leg members are able to be securely positioned in an extended operative configuration or folded to a flat storage position.

Further objects and the many attendant advantages of the invention may be best understood by reference to the following detailed description taken in conjunction with the accompanying drawings in which like reference symbols designate like parts throughout the figures thereof.

BRIEF DESCRIPTION OF THE DRAWINGS

FIG. 1 is a perspective view of a foldable bicycle carrier in accordance with the present invention mounted on the rear of an automobile.

FIG. 2 is a plan view of the subject carrier when in a flat, collapsed position.

FIG. 3 is a side plan view of the subject carrier showing the leg members unfolded to permit engagement of the locking mechanism.

FIG. 4 is a perspective view of a leg member and a leg bracket in accordance with the present invention.

FIG. 5 is a partially fragmented side plan view of the subject carrier showing the leg members when locked in an extended operative configuration.

FIG. 6 is a plan view of a locking bracket in accordance with the present invention.

FIG. 7 is an end view of the leg members when locked in an extended operative configuration in accordance with the present invention.

FIG. 8 is a perspective view of a lower strap/bumper clamp combination in accordance with the present invention.

DESCRIPTION OF THE PREFERRED EMBODIMENT

Referring to FIGS. 1 and 2 of the drawings a foldable bicycle carrier in accordance with the present invention includes a U-shaped hanger member including a pair of carrying bars 2 and 4 joined by a central support bar 6, a pair of leg members 8 and 10 are rotatably attached to the carrier bars 2 and 4, respectively, by a pair of locking mechanisms 12 and 14. A pair of top straps 16 and 18 are secured at one end thereof to the carrier bars 2 and 4, respectively, by a pair of buckles 20 and 22. The loose ends of the straps 16 and 18 are equipped with trunk clamps 24 and 26, which permit the straps 16 and 18 to be secured to the upper portion of a vehicle trunk lid 28 as shown. A pair of lower straps 30 and 32 are attached to the extended support ends of the legs 8 and 10 by a pair of buckles 34 and 36 to permit the respective lower straps 30 and 32 to be used to secure the legs by having the loose ends of the lower straps clamped beneath a vehicle bumper 38 by a pair of bumper clamps 40 and 42.

As shown by FIG. 2, each of the leg members 8 and 10 are L-shaped, with the support ends thereof provided with footpads 44 and 46, a pair of pads 48 and 50 are also mounted in spaced apart relationship on the support bar 6 of the hanger member.

The footpads 44 and 46 and the support pads 48 and 50 may be made of rubber or other like material and serve to create a soft non-destructive contact surface between the carrier and a vehicle.

As shown in FIG. 1, the pads 44, 46, 48 and 50 are placed in contact with the surface of an automobile when the bicycle carrier is mounted thereon. The pads thus serve to protect the surface of the automobile from the metal parts of the carrier to prevent scratching or other damage to the surface of the automobile.

The support pads 48 and 50 may be shaped to have a flat elongate portion to permit a substantial distribution of the weight of bicycles being carried so as to prevent accidental denting of the trunk lid 28 of the automobile.

The trunk clamps 24 and 26 and the bumber clamps 40 and 42 may be of any conventional design that permits the clamps to be fastened to the edge of the trunk lid and the lower edge of the bumper. An example is illustrated by FIG. 8, wherein a hook-shaped bumber clamp 42 having a hooked portion 43 may be readily positioned to engage the lower edge of a bumper prior to having the straps tightened by manipulation of the strap in the buckle 36 or by the use of an additional buckle 45.

It is to be noted at this juncture with reference to FIGS. 2 and 4 that the respective leg members 8 and 10 are mounted on a leg bracket 52 so as to be slideable within the bracket 52 in the direction of the longitudinal axis of the longer portion of each leg member. The ability of the leg members 8 and 10 to be slid in the direction of said longitudinal axis within said leg bracket 52 permits the legs 8 and 10 to be positioned as shown in FIG. 2 with the end portions and footpads 44 and 46 positioned generally one above or adjacent the other in the same plane. Such positioning of the leg members 8 and 10 permits the subject carrier to be folded on a configuration occupying a single plane and thus minimize the amount of space required for storage.

Converting a bicycle carrier from a folded configuration to an extended configuration simply involves swiveling the respective legs 8 and 10 with respect to the hanger member as shown by FIG. 3, wherein the leg members 8 and 10 are swiveled away from the carrier bars 2 and 4 for approximately 135 degrees as shown by FIG. 3. Such swiveling serves to rotate the leg bracket 52 past a locking bracket 54. Each of the leg members 8 and 10 may then be rotated outwardly in opposite directions to properly position the leg members as shown by FIG. 7.

Referring to FIG. 4, leg member 10 would be rotated in a counter-clockwise direction to have the positioning bolt 56 inserted into a positioning slot 58. The leg member 8 would be rotated in a clockwise direction to have the position bolt 56 thereon inserted into the positioning slot 58 of the leg bracket 52 associated therewith. It is to be noted that the leg members 8 and 10 may be readily moved along the longitudinal axis thereof to have the positioning bolt 56 aligned with the positioning slot 58.

Referring now to FIG. 5, the leg members 8 and 10 may be subsequently rotated or swiveled back towards the carrier bars 2 and 4 for approximately 45 degrees to have the positioning bolt snugly seated in the locking slot 60 of the locking bracket 54. As shown by FIGS. 5 and 6, the locking slot 60 is arcuate to conform to the radial rotation of the positioning bolt 56 about the center or rotation formed by the swivel bolt 62 which rotatably secured the legs 8 and 10 to the carrier bars 2 and 4, respectively.

Referring to FIG. 6, the locking brackets 54 are equipped with a plurality of apertures 64, 66 and 68 to permit the locking bracket 54 to be adjusted to have the legs 8 and 10 adjusted with respect to the carrier bars 2 and 4 to best accommodate the trunk design of an automobile. As shown by FIG. 5, a bolt 70 locks each of the locking brackets 54 to the carrier bars 2 and 4 of the hanger member by being inserted in one of the apertures 64, 66 and 68. When the aperture 64 is used as shown in FIG. 5, the legs and carrier bars are retained at approximately a 90 degree angle. A smaller angle would be obtained by the use of aperture 66 or 68 on each locking bracket by having the bolt 70 inserted therethrough. An aperture 72 serves to permit the bolt 62 to be extended through the locking bracket 54 to the leg bracket 52. As shown by FIG. 4, an aperture 74 is provided on the leg bracket to allow the bolt 62 to be extended to secure the leg bracket 52 and thereby rotatably mount the legs to the hanger member.

It is to be noted that the hanger member and the leg members may be constructed by using one-inch steel tubing or the like. As shown by FIGS. 3 and 5, the ends 76 of the carrier bars 2 and 4 may be flattened and turned upward to lend assistance in retaining a bicycle on the carrier bars 2 and 4. A plastic or vinyl covering may be used to cover the ends 76 to prevent damage to a bicycle being carried. Similarly, a plastic cap 78 may be used to cover the ends of the leg members 8 and 10.

Referring to FIG. 7, it is to be noted that the short portion of each of the leg members 8 and 10 are tilted away from each other as illustrated. It has been found that an approximate ten degree tilt for each of the leg members 8 and 10 is desireable although other degrees of tilt may be used. The tilting of the leg members 8 and 10 serves to contribute substantially to the stability of the subject carrier by preventing a collapse due to the positioning bolt 56 being accidentally dislodged from the positioning slot 58 and the locking slot 60 when the carrier is in an extended operative configuration. To the contrary, the tilted legs aid in maintaining the positioning bolt 56 in the slots 58 and 60.

It is to be understood that while specific materials and configurations have been described for use, reasonable use may be made of conventional prior art materials.

While a preferred embodiment of the present invention has been described hereinabove, it is intended that all matter contained in the above description and shown in the accompanying drawings be interpreted as illustrative, and not in a limiting sense, and that all modifications, instructions, and arrangements which fall within the scope and spirit of the invention may be made.

What is claimed is:

1. A foldable carrier for being mounted on motor vehicles, said carrier comprising:
   a U-shaped hanger member formed to have a pair of carrier bars each joined at one end thereof by a support bar;
   a pair of L-shaped leg members having a short portion and a long portion;
   locking means for movably attaching each of said leg members to a different one of said carrier bars, said locking means including a pair of locking mechanisms each including:
   a leg bracket slideably mounted on a leg member;
   a locking bracket mounted on a carrier bar;
   a retention bolt extending through said carrier bar, said locking bracket and said leg bracket to form a pivot;
   a positioning member mounted on said leg member for engaging said locking bracket and said leg bracket when said carrier is locked in an extended operative configuration with said long portion of said leg members being parallel to each other and transverse to said carrier bars and the short portion of said leg members being tilted away from each other.

2. The foldable carrier defined by claim 1, said locking bracket being a flat plate and having a locking portion and a positioning portion, said locking bracket including a plurality of positioning apertures on said positioning portion for allowing adjustment of the slope of the carrier bars to accommodate the configuration of a motor vehicle on which a carrier is to be mounted, said positioning apertures being adapted to receive a bolt for securing said locking bracket to said carrier bar.

3. The foldable carrier defined by claim 2, said locking bracket further including a locking slot for receiving said positioning member and having said positioning member seated therein when said carrier is in an extended operative configuration, said locking slot being formed on one edge of said locking portion of said locking bracket.

4. The foldable carrier defined by claim 3, said locking slot being arcuate.

5. The foldable carrier defined by claim 2, said leg bracket comprising a central portion and a pair of end positions which are situated parallel to each other and perpendicular to said central portion, said end portions each having a bore through which a leg member extends to be slideably retained on said leg bracket, said positioning member mounted on said leg member being situated between said end portions.

6. The foldable carrier defined by claim 5, said locking bracket further including a locking slot for receiving said positioning member and having said positioning member seated therein when said carrier is in an extended operative configuration, said locking slot being formed on one edge of said locking portion of said locking bracket.

7. The foldable carrier defined by claim 6, said leg bracket further including a positioning slot for receiving said positioning member which is seated therein by rotation of said leg member about the longitudinal axis of the long portion thereof.

8. The foldable carrier defined by claim 7, said locking slot being arcuate.

9. The foldable carrier defined by claim 8, wherein said central portion of said leg bracket is a planar member that is positioned parallel and adjacent to said locking bracket, with said locking slot and said positioning slot aligned to have said positioning member seated in both said locking slot and said positioning slot when said carrier is in an extended operative configuration.

10. The foldable carrier defined by claim 1, said leg bracket comprising a central portion and a pair of end portions which are situated parallel to each other and perpendicular to said central portion, said end portions each having a bore through which a leg member extends to be slideably retained on said leg bracket, said positioning member mounted on said leg member being situated between said end portions.

11. The foldable carrier defined by claim 10, said leg bracket further including a positioning slot for receiving said positioning member which is seated therein by rotation of said leg member about the longitudinal axis of the long portion thereof.

* * * * *